United States Patent
Li et al.

(10) Patent No.: US 12,404,380 B2
(45) Date of Patent: Sep. 2, 2025

(54) HIGH-MODULUS BLACK MATTE POLYIMIDE FILM

(71) Applicant: TAIMIDE TECHNOLOGY INCORPORATION, Hsinchu Hsien (TW)

(72) Inventors: Chun-Hua Li, Hsinchu Hsien (TW); Jia-Hao Wu, Hsinchu Hsien (TW)

(73) Assignee: TAIMIDE TECHNOLOGY INCORPORATION, Hsinchu Hsien (TW)

( * ) Notice: Subject to any disclaimer, the term of this patent is extended or adjusted under 35 U.S.C. 154(b) by 249 days.

(21) Appl. No.: 18/336,050

(22) Filed: Jun. 16, 2023

(65) Prior Publication Data

US 2023/0416480 A1    Dec. 28, 2023

(30) Foreign Application Priority Data

Jun. 22, 2022   (TW) .................. 111123233

(51) Int. Cl.
| | |
|---|---|
| *C08J 5/18* | (2006.01) |
| *C08G 73/10* | (2006.01) |
| *C08K 3/04* | (2006.01) |
| *C09K 19/38* | (2006.01) |
| *C09K 19/52* | (2006.01) |
| *C09K 19/54* | (2006.01) |

(52) U.S. Cl.
CPC ............ *C08J 5/18* (2013.01); *C08G 73/1042* (2013.01); *C08G 73/105* (2013.01); *C08G 73/1071* (2013.01); *C08K 3/04* (2013.01); *C08J 2379/08* (2013.01); *C08K 2201/005* (2013.01); *C09K 19/38* (2013.01); *C09K 2019/521* (2013.01); *C09K 19/544* (2013.01)

(58) Field of Classification Search
CPC ..... C08J 5/18; C08J 2379/08; C08G 73/1042; C08G 73/105; C08G 73/1071; C08G 73/1067; C08K 3/04; C08K 2201/005; C09K 19/38; C09K 19/544; C09K 2019/521; C09D 179/08
See application file for complete search history.

(56) References Cited

U.S. PATENT DOCUMENTS

| | | |
|---|---|---|
| 9,284,424 B2 | 3/2016 | Lin et al. |
| 9,631,054 B2 | 4/2017 | Carney et al. |
| 2011/0177321 A1* | 7/2011 | Carney ................ C08G 73/105 428/323 |
| 2015/0064484 A1* | 3/2015 | Chung ................ C08G 73/105 428/458 |

FOREIGN PATENT DOCUMENTS

| | | | | |
|---|---|---|---|---|
| TW | I487745 B | 6/2015 | | |
| TW | 202216926 A | 5/2022 | | |
| WO | WO-2017150336 A1 * | 9/2017 | ............ | C08L 101/00 |
| WO | WO-2022108296 A1 * | 5/2022 | | |

* cited by examiner

*Primary Examiner* — John D Freeman

(57) ABSTRACT

A high-modulus black matte polyimide film is provided, the high-modulus black matte polyimide film includes polyimide in an amount from 75 to 93 wt % of the high-modulus matte polyimide film, in which dianhydride and diamine are polymerized to form a polyimide precursor, and the polyimide precursor is chemically cyclized to form the polyimide; carbon black in an amount from 2 to 8 wt % of the high-modulus matte polyimide film; and liquid crystal polymer micropowder having a particle size between 2 and 10 μm and being in an amount from 5 to 20 wt % of the high-modulus matte polyimide film, wherein the high-modulus matte polyimide film has a gloss value at 60° being less than 50.

6 Claims, No Drawings

HIGH-MODULUS BLACK MATTE POLYIMIDE FILM

CROSS-REFERENCE TO RELATED APPLICATION

This non-provisional application claims priority under 35 U.S.C. § 119(a) on Patent Application No(s). 111123233 filed in Taiwan, R.O.C. on Jun. 22, 2022, the entire contents of which are hereby incorporated by reference.

BACKGROUND OF THE INVENTION

1. Field of the Invention

The present disclosure relates to a high-modulus black matte polyimide film, and more particularly to a black matte polyimide film that uses liquid crystal polymer micropowder as a matting agent to increase its modulus and reduce thermal expansion coefficient.

2. Description of the Related Art

Polyimide (PI) has the characteristics such as good heat resistance, chemical resistance, mechanical strength and high electrical impedance, and has been widely used in the electronic industry. Currently, black matte polyimides are mostly used in consumer electronic components. In order to achieve a matte appearance, additional matting materials are added. Matting particles are inorganic or organic. Inorganic matting particles, such as silica or metal oxide powders, have good matting properties, but are less compatible with polyimide substrates. The organic matting particle is usually polyimide powder, which has good compatibility with the polyimide substrate, but causes insufficient mechanical strength, low modulus and excessive thermal expansion coefficient when added to the polyimide substrate.

U.S. Pat. No. 9,631,054B2 discloses a black polyimide film, in which polyimide micropowder is used as a matting agent, and its base composition includes pyromellitic dianhydride (PMDA) and 4,4'-oxydianiline (ODA). Since the polyimide micropowder and the polyimide base are organic materials, the thermal expansion coefficient of the black polyimide film is higher than that made of the inorganic matting powder. The higher thermal expansion coefficient causes the problem of warpage after the glue and copper are adhered in the subsequent process due to the large difference in the thermal expansion coefficient between the organic material and the adhesion.

U.S. Pat. No. 9,284,424B2 discloses that polyimide (PI) micropowder is used to form a polyimide film with matting characteristics. The polyimide micropowder is in an amount of 15-30 wt % to achieve a 60° gloss value (<10 GU); however, the polyimide micropowder has adverse effects on the mechanical properties of polyimide films. In addition to a decrease in modulus, the coefficient of thermal expansion coefficient increases, which not only affects the durability of the product, but also causes the aforementioned problem of warpage.

Improving the modulus and mechanical strength of polyimide products can reduce the thermal expansion coefficient of soft board materials. If the thermal expansion coefficient value of the material is close to the thermal expansion coefficient value of the copper foil, the deformation stress caused by temperature changes can be reduced. Otherwise, the temperature rise due to power-on operation after welding or making electronic components may lead to deformation of the components, resulting in a decrease in reliability or even failure.

In the conventional methods for increasing the modulus of polyimide films, the amount of the diamine is adjusted to increase the molar ratio of p-phenylenediamine (PDA). The PDA improves mechanical strength, but decreases the alkali resistance of the polyimide film.

The present disclosure provides a high-module black matte polyimide film, which increases the modulus of the polyimide film while improving the matting property of the polyimide film, reduces the thermal expansion coefficient, and improves the quality of the processed product.

BRIEF SUMMARY OF THE INVENTION

The high-modulus black matte polyimide film of the present disclosure includes: polyimide in an amount from 75 to 93 wt % of the high-modulus matte polyimide film, in which dianhydride and diamine are polymerized to form a polyimide precursor, and the polyimide precursor is chemically cyclized to form the polyimide; carbon black in an amount from 2 to 8 wt % of the high-modulus matte polyimide film; and liquid crystal polymer micropowder having a particle size between 2 and 10 µm and being in an amount from 5 to 20 wt % of the high-modulus matte polyimide film, wherein the high-modulus matte polyimide film has a gloss at 60° C. being less than 50 GU.

The liquid crystal polymer micropowder (LCP) can increase the modulus of polyimide film without changing the polyimide composition. This is effective when there is no p-phenylenediamine (PDA) in the composition, and the modulus can also be increased for films containing p-phenylenediamine (PDA).

DETAILED DESCRIPTION OF THE INVENTION

The high-modulus black matte polyimide film of the present disclosure includes polyimide in an amount from 75 to 93 wt % of the high-modulus matte polyimide film, in which dianhydride and diamine are polymerized to form a polyimide precursor, and the polyimide precursor is chemically cyclized to form the polyimide; carbon black in an amount from 2 to 8 wt % of the high-modulus matte polyimide film; and liquid crystal polymer micropowder having a particle size between 2 and 10 µm in an irregular shape and being in an amount from 5 to 20 wt % of the high-modulus matte polyimide film, wherein the high-modulus matte polyimide film has a gloss at 60° being less than 50 GU, a modulus being greater than 3.5 Gpa, and a thermal expansion coefficient being less than 30 ppm, and the liquid crystal polymer micropowder has a diameter-to-length ratio being less than 20.

Preparation of Polyimide Precursor

The polyimide precursor is made of dianhydride and diamine, and wherein the dianhydride is pyromellitic dianhydride (PMDA) or 3,3',4,4'-biphenyltetracarboxylic dianhydride (BPDA), and the diamine includes 4,4'-oxydianiline (ODA) and p-phenylenediamine (PDA). In the present disclosure, PMDA is in an amount from 65 to 98 wt % of the dianhydride, BPDA is in an amount from 2 to 35 wt % of the dianhydride, ODA is an amount from 30 to 90 wt % of the diamine, and PDA is in an amount from 10 to 70 wt % of the diamine.

In the preparation of the polyimide precursor, p-phenylenediamine (PDA) is mixed with a solvent to form a mixture, and then then mixture is added with a small amount of pyromellitic dianhydride (PMDA) to form the first segment, and the number of moles of the diamine in the first segment is greater than that of the dianhydride. In the preparation of polyimide solution, dimethylacetamide (DMAc), N-methylpyrrolidone (NMP), N-ethyl-2-pyrrolidone (NEP), γ-butyrolactone (GBL), or N,N-dimethylformamide (DMF) can be used as the solvent. In this embodiment, dimethylacetamide (DMAc) is used as the solvent.

The first segment solution is added with 4,4'-oxydianiline (ODA), after the mixture is completely dissolved, pyromellitic dianhydride (PMDA) is added and stirred for 1 hour, and then 3,3',4,4'-biphenyltetracarboxylic dianhydride (BPDA) is added. Then, viscosity adjustment is performed so as to adjust the viscosity of the solution to 100,000 cps-250,000 cps. At this time, the solid content of the solution can be between 15 and 25 wt %, that is, the preparation of the polyimide precursor is completed.

Preparation of Liquid Crystal Polymer Micropowder Slurry

In the preparation of liquid crystal polymer micropowder slurry, liquid crystal polymer micropowder and dimethylacetamide are mixed in a weight ratio of 1:9 to form a solution, stirred well and filtered with a 100 mesh sieve for reflux filtration to ensure that there is no aggregation.

Preparation of Carbon Black Slurry

The carbon black and dimethylacetamide are mixed in a weight ratio of 1:7 to form a solution, and stirred well. Then, the solution was ground for 30 minutes with 0.8 mm zirconium beads and a filling rate of 50% by volume of zirconium beads, so as to form the black matte slurry.

The carbon black in the black matte slurry is insulating carbon black. In the present disclosure, Evonik SPECIAL BLACK 4A (SB4A) is used as the insulating carbon black.

The weight ratio of carbon black, polyimide micropowder and dimethylacetamide in the carbon black slurry can be adjusted as required, wherein the weight ratio between carbon black and polyimide micropowder is related to penetration and gloss. In the present disclosure, the carbon black is in an amount from 2 to 8 wt % of the black polyimide film, and the polyimide micropowder is in an amount from 5 to 10% of the weight of the black polyimide film.

Preparation of Black Matte Polyimide Film

The black matte slurry and the polyimide precursor are mixed and stirred evenly, and then a catalyst and a dehydrating agent are added for chemical cyclization. The dehydrating agent can be acetic anhydride or benzoic anhydride. In the present disclosure, acetic anhydride is used as the dehydrating agent, and the catalyst can be pyridine, 3-methylpyridine, 2-methylpyridine, 4-methylpyridine, isoquinoline, quinoline and triethylamine, wherein the preferred catalysts are pyridine, 3-methylpyridine, 2-methylpyridine and 4-methylpyridine. In the present disclosure, 3-methylpyridine is used as the catalyst.

The catalyzer and the dehydrating agent can be used alone, or can be mixed and diluted with solvent. After being stirred evenly, the mixed solution of the catalyzer and the dehydrating agent is defoamed by a centrifugal defoaming machine. The defoamed solution is coated on a glass plate by a blade with a gap of 300 μm. After being applied to the glass plate, the coated sample is placed in an oven at 80° C. for 20 minutes, heated to 170° C. for 20 minutes, and then heated to 350° C. for 20 minutes as the final treatment. Then, the glass plate is placed in water, and the film is removed to obtain a black matte polyimide film.

In addition to the glass plate, a metal plate can be used in the above preparation. In the case that a metal plate is used in the preparation of a black matte polyimide film, after the coated sample is baked and dried in an oven at 80° C., the semi-dry film needs to be removed from the metal plate. The semi-dry film is fixed on a metal frame, heated to 170° C. for 20 minutes, and then heated to 350° C. for 20 minutes, such that a black matte polyimide film is obtained.

In the present disclosure, the black matte polyimide film has a thickness of 5 μm to 100 μm.

The black matte polyimide film can be used as a cover film, which has an adhesive layer and a base film.

EXAMPLES

<Detection Methods>

Various properties of the composite films obtained in the following examples were measured using the following methods.

Thermal expansion coefficient (100° C.-200° C.): according to ASTM D696 standard, the model Q400 TMA instrument from TA Instruments is used for the measurement. The thermal expansion coefficient of the polyimide film is measured at 100° C. to 200° C., and the heating rate is set to 10° C./min. In order to eliminate the stress caused by the heat treatment, after removing the residual stress by the first measurement, the second measurement result is used as the actual value.

Optical transmittance: according to ISO 14782 standard, the model NDH-2000N instrument from Nippon Denshoku company is used for the measurement.

Gloss: the BYK brand, model micro-TRI-gloss gloss meter is used to measure the gloss at 60 degrees.

Example 1

Preparation of Liquid Crystal Polymer Micropowder (LCP)

50 g of liquid crystal polymer micropowder (LCP) and 450 g of dimethylacetamide were mixed and stirred well, and then filtered with a 100-mesh metal screen to filter, so as to ensure that there is no aggregation. The average particle size of the obtained powder detected by a particle size analyzer (model Horiba LA-950, Horiba Instruments) was about 7 μm.

Preparation of Polyimide Precursor 9.72 g of p-phenylenediamine (PDA) was added in 410 g of dimethylacetamide to form a mixture, and the mixture was stirred. After p-phenylenediamine (PDA) was completely dissolved, 16.53 g of 3,3',4,4'-biphenyltetracarboxylic dianhydride (BPDA) was added and stirred, and the reaction was carried out for 30 minutes. Then, 26.99 g of 4,4'-oxydianiline (ODA) was added and dissolved, then 34.32 g of pyromellitic dianhydride (PMDA) was slowly added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 165,000 cps.

Preparation of Carbon Black Slurry

The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 5.4 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 8.9 ml of the diluted acetic anhydride solution and 5.1 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Example 2

The preparation of liquid crystal polymer micropowder was the same as that in Example 1.
Preparation of Polyimide Precursor 43.06 g of 4,4'-oxydianiline (ODA) was added in 410 g of dimethylacetamide to form a mixture, and the mixture was stirred. The mixture was added with 42.24 g of pyromellitic dianhydride (PMDA) slowl, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 186,000 cps.
Preparation of Carbon Black Slurry The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 5.4 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 9.1 ml of the diluted acetic anhydride solution and 5.2 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Example 3

The preparation of polyimide micropowder was the same as that in Example 1.
Preparation of Polyimide Precursor 8.82 g of p-phenylenediamine (PDA) was added in 410 g of dimethylacetamide to form a mixture, and the mixture was stirred. After p-phenylenediamine (PDA) was completely dissolved, 4,4'-oxydianiline (ODA) was added and stirred, and the reaction was carried out for 30 minutes. Then, 30.33 g of 4,4'-oxydianiline (ODA) was added and dissolved, then 45.77 g of pyromellitic dianhydride (PMDA) was slowly added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 172,000 cps.
Preparation of Carbon Black Slurry The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 5.4 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 9.2 ml of the diluted acetic anhydride solution and 5.3 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Example 4

Preparation of polyimide micropowder was the same as that in Comparative Example 1.
Preparation of Polyimide Precursor 43.06 g of 4,4'-oxydianiline (ODA) was added in 410 g of dimethylacetamide to form a mixture, and the mixture was stirred. Then, 42.24 g of pyromellitic dianhydride (PMDA) was added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 180,000 cps.
Preparation of Carbon Black Slurry The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 2.16 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 9.2 ml of the diluted acetic anhydride solution and 5.3 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Example 5

Preparation of polyimide micropowder was the same as that in Comparative Example 1.
Preparation of Polyimide Precursor
43.06 g of 4,4'-oxydianiline (ODA) was added in 410 g of dimethylacetamide to form a mixture, and the mixture was stirred. Then, 42.24 g of pyromellitic dianhydride (PMDA) was added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 182,000 cps.
Preparation of Carbon Black Slurry
The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 13 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 9.2 ml of the diluted acetic anhydride solution and 5.3 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Example 6

Preparation of polyimide micropowder was the same as that in Comparative Example 1.
Preparation of Polyimide Precursor
43.06 g of 4,4'-oxydianiline (ODA) was added in 410 g of dimethylacetamide to form a mixture, and the mixture was stirred. Then, 42.24 g of pyromellitic dianhydride (PMDA) was added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 185,000 cps.
Preparation of Carbon Black Slurry
The Evonik SPECIAL BLACK 4A (SB4A) insulating carbon black and dimethylacetamide were placed into a solution in a weight ratio of 1:7. After the solution was stirred and mixed evenly, the solution was ground with 0.8 mm zirconium beads for 30 minutes with a zirconium bead filling rate of 50% by volume. After being ground, 2.25 g of the solution was taken out, added with 40 g of polyamic acid solution and then mixed with 18 g of liquid crystal polymer micropowder (LCP) to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 9.2 ml of the diluted acetic anhydride solution and 5.3 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 µm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Comparative Example 1

Preparation of Polyimide Micropowder
In the preparation of polyimide micropowder, 4,4'-oxydianiline (ODA) and dimethylacetamide were mixed in a three-necked flask, and then pyromellitic dianhydride (PMDA) was slowly added. The mixture was continuously stirred and heated at about 170° C., and the reaction was carried out for about 18 hours to obtain a polyimide precipitate. The polyimide precipitate was washed with water and ethanol, vacuum filtered, heated and dried at about 160° C. for about 1 hour, and thus polyimide micropowder was obtained. The average particle size of the obtained powder was detected by a particle size analyzer (model Horiba LA-950, Horiba Instruments).
In the polyimide micropowder, a monomer molar ratio of the diamine compound to the dianhydride compound is in a range from 1:0.950 to 1:0.995, and the solid content is controlled between 5 and 15 wt % during polymerization. The polyimide micropowder with a particle size between 2 and 10 µm is obtained. The effective particle size (S) of the polyimide micropowder is more than 70%, and the effective particle size (S) is defined as:

$$S=B/(A+B+C)\times 100\%$$

A: percentage of polyimide micropowder with particle size less than 2 µm;
B: percentage of polyimide micropowder with particle size 2-10 µm;
C: percentage of polyimide micropowder with particle size greater than 10 µm.
Preparation of Polyimide Precursor
9.72 g of p-phenylenediamine (PDA) was added in 410 g of dimethylacetamide to form a mixture, and the mixture was stirred. After p-phenylenediamine (PDA) was completely dissolved, 16.53 g of 3,3',4,4'-biphenyltetracarboxylic dianhydride (BPDA) was added and stirred, and the reaction was carried out for 30 minutes. Then, 26.99 g of 4,4'-oxydianiline (ODA) was added and dissolved, then 34.32 g of pyromellitic dianhydride (PMDA) was slowly added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 168,000 cps.
Preparation of Black Matte Slurry
The Evonik SPECIAL BLACK 4A (SB4A) insulating carbon black, polyimide micropowder and dimethylacetamide were placed into a solution in a weight ratio of 1:1.9:18. After the solution was stirred and mixed evenly, the solution was ground with 0.8 mm zirconium beads for 30 minutes with a zirconium bead filling rate of 50% by volume. After being ground, 6 g of the solution was taken out, added with 40 g of polyamic acid solution to form a mixture, and the mixture was stirred and mixed evenly.

Acetic anhydride and dimethylacetamide were diluted in a weight ratio of 2 to 1, and 3-methylpyridine and dimethylacetamide were diluted a weight ratio of 1 to 1. Then, 8.9 ml of the diluted acetic anhydride solution and 5.1 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 μm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Comparative Example 2

The preparation of polyimide micropowder is the same as that in Comparative Example 1.
Preparation of Polyimide Precursor 43.06 g of 4,4'-oxydianiline (ODA) was added in 410 g of dimethylacetamide to form a mixture, and the mixture was stirred. 42.24 g of pyromellitic dianhydride (PMDA) was slowly added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 171,000 cps.
Preparation of Black Matte Slurry The Evonik SPECIAL BLACK 4A (SB4A) insulating carbon black, polyimide micropowder and dimethylacetamide were placed into a solution in a weight ratio of 1:1.9:18. After the solution was stirred and mixed evenly, the solution was ground with 0.8 mm zirconium beads for 30 minutes with a zirconium bead filling rate of 50% by volume. After being ground, 6 g of the solution was taken out, added with 40 g of polyamic acid solution to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 8.9 ml of the diluted acetic anhydride solution and 5.1 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 μm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

Comparative Example 3

The preparation of polyimide micropowder is the same as that in Comparative Example 1.
Preparation of Polyimide Precursor 8.82 g of p-phenylenediamine (PDA) was added in 410 g of dimethylacetamide to form a mixture, and the mixture was stirred. After p-phenylenediamine (PDA) was completely dissolved, 4,4'-oxydianiline (ODA) was added and stirred, and the reaction was carried out for 30 minutes. Then, 30.33 g of 4,4'-oxydianiline (ODA) was added and dissolved, then 45.77 g of pyromellitic dianhydride (PMDA) was slowly added, and the temperature was kept at 25° C. After the reaction was carried out for one hour, a trace amount of pyromellitic dianhydride (PMDA) was gradually used to adjust the viscosity to form a polyamic acid solution with a solid content of 18 wt % and a viscosity of 164,000 cps.
Preparation of Black Matte Slurry The Evonik SPECIAL BLACK 4A (SB4A) insulating carbon black, polyimide micropowder and dimethylacetamide were placed into a solution in a weight ratio of 1:1.9:18. After the solution was stirred and mixed evenly, the solution was ground with 0.8 mm zirconium beads for 30 minutes with a zirconium bead filling rate of 50% by volume. After being ground, 6 g of the solution was taken out, added with 40 g of polyamic acid solution to form a mixture, and the mixture was stirred and mixed evenly. Acetic anhydride and dimethylacetamide were diluted in a weight ratio of 2 to 1, and 3-methylpyridine and dimethylacetamide were diluted a weight ratio of 1 to 1. Then, 8.9 ml of the diluted acetic anhydride solution and 5.1 ml of the diluted 3-methylpyridine solution were added to the mixture of the polyamic acid solution and the ground solution. After being stirred and mixed evenly, the mixed solution was defoamed by a centrifugal defoaming machine. The defoamed solution was coated on the glass plate by a blade with a gap of 300 μm. The coated sample was placed in an oven at 80° C. for 20 minutes, heated to 170° C. at a rate of 1.8° C./min for 20 minutes, and then heated to 350° C. at a rate of 2.0° C./min for 20 minutes as the final treatment.

The following table shows the comparison between Examples and Comparative Examples.

| | filler | dianhydride | mol % | diamine | | carbon black wt % | filler wt % | modulus Gpa | thermal expansion coefficient ppm/° C. | optical transmittance % | gloss |
|---|---|---|---|---|---|---|---|---|---|---|---|
| Example 1 | LCP | PMDA 75 | BPDA 25 | ODA 60 | PDA 40 | 3.9 | 7.5 | 4.5 | 21 | 0.38 | 25.3 |
| Example 2 | LCP | PMDA 100 | BPDA 0 | ODA 100 | PDA 0 | 3.9 | 7.5 | 3.6 | 25 | 0.39 | 25.2 |
| Example 3 | LCP | PMDA 100 | BPDA 0 | ODA 65 | PDA 35 | 3.9 | 7.5 | 4.1 | 23 | 0.4 | 25 |
| Example 4 | LCP | PMDA 100 | BPDA 0 | ODA 100 | PDA 0 | 3.9 | 3 | 3 | 32 | 0.44 | 69 |
| Example 5 | LCP | PMDA 100 | BPDA 0 | ODA 100 | PDA 0 | 3.9 | 18 | 4.2 | 23 | 0.4 | 14 |
| Example 6 | LCP | PMDA 100 | BPDA 0 | ODA 100 | PDA 0 | 3.9 | 25 | No film was formed | — | — | — |
| Comparative Example 1 | PIP | PMDA 75 | BPDA 25 | ODA 60 | PDA 40 | 3.9 | 7.5 | 4.1 | 30 | 0.42 | 23 |

-continued

|  | filler | dianhydride |  | mol % | diamine |  |  | carbon black wt % | filler wt % | modulus Gpa | thermal expansion coefficient ppm/° C. | optical transmittance % | gloss |
|---|---|---|---|---|---|---|---|---|---|---|---|---|---|
| Comparative Example 2 | PIP | PMDA 100 | BPDA 0 |  | ODA 100 | PDA 0 |  | 3.9 | 7.5 | 2.9 | 33 | 0.49 | 23.2 |
| Comparative Example 3 | PIP | PMDA 100 | BPDA 0 |  | ODA 65 | PDA 35 |  | 3.9 | 7.5 | 3.5 | 25 | 0.45 | 23.3 |

While the present disclosure has been described by means of specific embodiments, numerous modifications and variations could be made thereto by those skilled in the art without departing from the scope and spirit of the present disclosure set forth in the claims.

What is claimed is:

1. A high-modulus black matte polyimide film, comprising:
    polyimide in an amount from 75 to 93 wt % of the high-modulus matte polyimide film, in which dianhydride and diamine are polymerized to form a polyimide precursor, and the polyimide precursor is chemically cyclized to form the polyimide;
    carbon black in an amount from 2 to 8 wt % of the high-modulus matte polyimide film; and
    liquid crystal polymer micropowder having a particle size between 2 and 10 μm and being in an amount from 7.5 to 20 wt % of the high-modulus matte polyimide film,
    wherein the high-modulus matte polyimide film has a gloss value at 60° being less than 50.

2. The high-modulus black matte polyimide film according to claim 1, wherein the dianhydride is pyromellitic dianhydride (PMDA), and the diamine is 4,4'-oxydianiline (ODA).

3. The high-modulus black matte polyimide film according to claim 1, wherein the dianhydride is pyromellitic dianhydride (PMDA), and the diamine includes 4,4'-oxydianiline (ODA) and p-phenylenediamine (PDA) and, the ODA is an amount from 30 to 90 wt % of the diamine, and the PDA is in an amount from 10 to of the diamine.

4. The high-modulus black matte polyimide film according to claim 1, wherein the dianhydride includes pyromellitic dianhydride (PMDA) and 3,3',4,4'-biphenyltetracarboxylic dianhydride (BPDA), the diamine includes Phenylenediamine (PDA) and 4,4'-oxydianiline (ODA), the PMDA is in an amount from 65 to 98 wt % of the dianhydride, the BPDA is in an amount from 2 to 35 wt % of the dianhydride, the ODA is in an amount from 30 to 90 wt % of the diamine, and the PDA is in an amount from 10 to 70 wt % of the diamine.

5. The high-modulus black matte polyimide film according to claim 1, having a modulus being greater than 3.5 Gpa, and a thermal expansion coefficient being less than 35 ppm/° C.

6. The high-modulus black matte polyimide film according to claim 1, wherein the liquid crystal polymer micropowder is in an irregular shape and has a diameter-to-length ratio being less than 20.

* * * * *